United States Patent [19]

Panehal

[11] 4,452,581
[45] Jun. 5, 1984

[54] COOKING UTENSIL

[76] Inventor: Mary Panehal, 1511 Parkwood Rd., Lakewood, Ohio 44107

[21] Appl. No.: 363,003

[22] Filed: Mar. 29, 1982

[51] Int. Cl.³ .................... A21C 11/16; A21C 3/04; B29D 7/02
[52] U.S. Cl. ........................ 425/464; 99/353; 99/407; 126/85 R; 126/369; 126/390; 209/486; 210/469; 220/85 R; 220/85 CH; 220/23.83; 248/94; 248/318
[58] Field of Search ............... 425/377, 382 R; 426/496, 503, 516, 517; 248/94, 205 R, 213.4, 318; 210/469-471, 474; 209/486; 99/345, 355, 411, 450, 353, 407, 439, 537; 126/85 R, 369, 386, 390; 220/23.83

[56] References Cited

U.S. PATENT DOCUMENTS

| 207,974 | 9/1878 | McConnell | 99/450 |
| 396,567 | 1/1889 | Held | 425/382 |
| 1,232,851 | 7/1917 | Sayers | 220/85 CH |
| 1,301,065 | 4/1919 | Kunst | 425/382 |
| 1,461,504 | 7/1923 | Tanzi | 425/319 |
| 1,672,738 | 6/1928 | Stampley | 99/411 |
| 2,544,846 | 3/1951 | Mack | 99/355 |
| 3,452,688 | 7/1969 | Spohn | 107/14 |
| 3,969,994 | 7/1976 | Kaneko et al. | 99/450.6 |
| 4,106,486 | 8/1978 | Lee | 126/369 |
| 4,262,586 | 4/1981 | Miller et al. | 99/345 |

FOREIGN PATENT DOCUMENTS

| 136876 | 2/1930 | Switzerland | 99/450 |
| 238 | of 1912 | United Kingdom | 99/450 |
| 202096 | 8/1923 | United Kingdom | 220/23.83 |
| 414859 | 8/1934 | United Kingdom | 220/85 CH |

Primary Examiner—Willard E. Hoag
Attorney, Agent, or Firm—Maky, Renner, Otto & Boisselle

[57] ABSTRACT

A cooking utensil comprising a pan with a flat bottom and vertical side means formed integrally with said bottom, and an array of evenly spaced substantially uniform holes formed in a portion of said bottom to provide a food extrusion area, the remaining portion of said bottom providing a food holding area.

15 Claims, 6 Drawing Figures

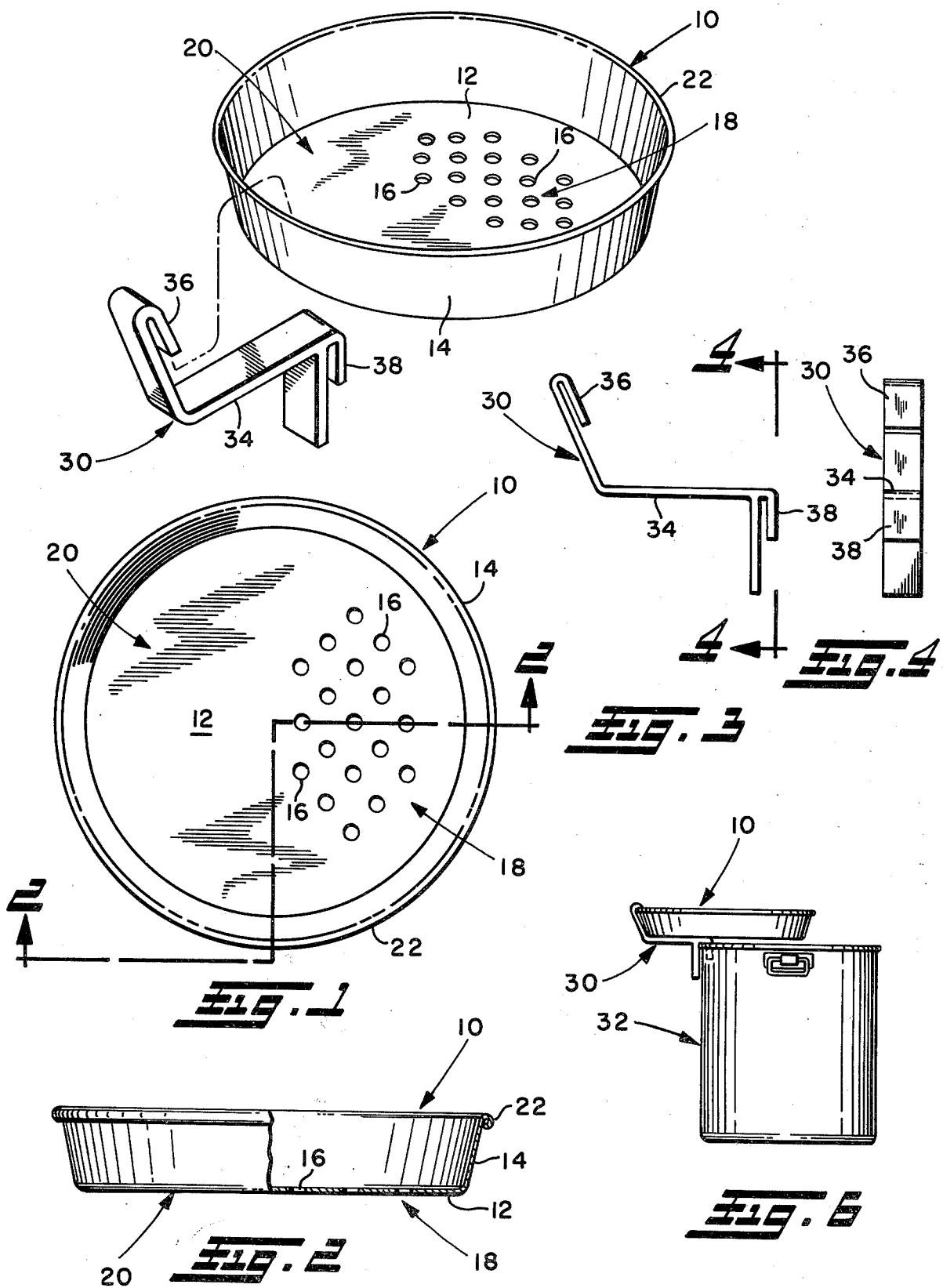

COOKING UTENSIL

TECHNICAL FIELD

This invention relates generally to cooking utensils, and more particularly, to cooking utensils for extruding food products such as dumplings and the like. Specifically, the invention relates to a flat-bottomed cooking utensil that includes a food holding area in one section of the utensil and a food extrusion area in another section of the utensil.

BACKGROUND OF THE INVENTION

Conventional baking pans that include a flat bottom and sides integrally formed with the bottom are well known. Such baking pans can be circular or rectangular in form and generally come in sizes that can be facilitatingly handled by a homemaker. Typical dimensions for circular baking pans range, for example, from about 7 to about 12 inches in diameter. A typical rectangular baking pan has dimensions of, for example, about 9 inches by about 12 inches.

Cooking utensils for the preparation of extruded food products are also known in the art. These utensils generally include a perforated section through which the food product is extruded and a device for forcing the food through the perforations. For example, U.S. Pat. No. 3,452,688 describes a dough extruding apparatus having an extrusion die 20 mounted directly above a cooking utensil C. The dough is extruded through the die by a force exerted on a pressure plate 26 by manually pushing handle 12 downwardly. U.S. Pat. No. 1,461,504 describes a macaroni die which includes a plurality of plates secured together and is adapted for producing food products with irregular shapes.

It would be advantageous to provide a cooking utensil that included the provision of a food-holding area in one section, and a food-extrusion area in another section so that the user could facilitatingly extrude a portion of the food product through the extrusion area, while at the same time maintain the remaining portion of the food product in the foodl holding area in such a manner so that the food product does not cook or set up prior to extrusion. It would also be advantageous if such a utensil was sufficiently lightweight so as to be facilitatingly handled and thereby have application as a household product. It would also be advantageous if such a utensil could be readily converted to a common baking pan. It would also be advantageous if such a utensil included attachment means for mounting the utensil on a cooking vessel.

SUMMARY OF THE INVENTION

Cooking utensils of the type illustrated in the drawings and hereinafter described include the provision of both a food-extrusion area and a food-holding area to facilitate the preparation of extruded food products. Such utensils can be readily converted to common baking pans and are sufficiently lightweight and simplified in design so as to be facilitatingly handled and used as household products.

Broadly state, the present invention contemplates the provision of a cooking utensil comprising a pan with a flat bottom and vertical side means formed integrally with said bottom, and an array of evenly spaced substantially uniform holes formed in a portion of said bottom to provide a food-extrusion area, the remaining portion of said bottom providing a food-holding area. Advantageously, the invention further contemplates the provision of clamping means for removably mounting the foregoing pan on a cooking vessel.

Further, the invention contemplates the provision of a kit having component parts, the kit comprising the foregoing cooking utensil, and, optionally, the foregoing clamping means, means such as a spatula for optionally mixing the food in the food-holding area and for extruding the food through the holes in the food-extrusion area, and/or a cooking vessel.

Further, the invention contemplates the provision of a process for making extruded food products such as dumplings and the like comprising: providing the foregoing cooking utensil in combination with a cooking vessel; providing said cooking vessel with liquid under conditions sufficient to cause such extruded food products to cook; depositing and optionally mixing an extrudable food product in said food-holding area; transferring said extrudable food product to said food extrusion area; extruding said extrudable food product through said holes to drop an extruded food product into said cooking vessel to form a cooked extruded food product.

BRIEF DESCRIPTION OF THE DRAWINGS

In the annexed drawings, like references indicate like parts or features:

FIG. 1 is a top plan view of a cooking utensil illustrating the present invention in a particular form;

FIG. 2 is a partially cross-sectioned side elevational view of the cooking utensil of FIG. 1 taken along line 2—2 of FIG. 1;

FIG. 3 is a side elevational view of a clamp for use with the cooking utensil of FIG. 1;

FIG. 4 is an elevational view of the clamp of FIG. 3 taken along line 4—4 of FIG. 3;

FIG. 5 is a perspective view of the cooling utensil of FIG. 1 and the clamp of FIG. 3; and FIG. 6 is a side elevational view illustrating the cooking utensil of FIG. 1 and the clamp of FIG. 3 assembled for use with a cooking vessel in accordance with the present invention.

DETAILED DESCRIPTION OF THE PREFERRED EMBODIMENT

The cooking utensil of the present invention, in its illustrated embodiment, comprises a pan 10 with a flat bottom 12 and vertical side wall 14 formed integrally with bottom 12, and an array of evenly spaced substantially uniform holes 16 formed in a portion of bottom 12 to define a food extrusion area 18, the remaining portion of said bottom 12 defining a food-holding area 20, all as hereinafter further explained.

Pan 10 is a lightweight circular article that is self-sustaining in shape and preferably made from heat-resistant plastic or thin-gauge sheet metal such as aluminum or steel. Preferably bottom 12 is sufficiently thin walled to enable facilitated dislodgement of food from holes 16 by scraping the top surface of bottom 12 with a standard stirring or scraping device such as a spatula. Pan 10 can be of any size that can be conveniently handled and used as a household product, preferably the size of a standard baking pan with a 7, 8, 9 or 12-inch diameter, for example. The vertical side wall 14 is formed integrally with the bottom 12 and typically has a vertical extent of about ½-inch to about 2¼-inches, preferably about 1½-inches. Vertical side wall 14 includes a top rolled edge 22 which is provided to facilitate gripping pan 10 and to reinforce side wall 14.

The food holding area 20 of pan 10 preferably covers at least half of the surface area of bottom 12. The food extrusion area 18 covers the remaining portion of the bottom 12 and includes an array of evenly spaced substantially uniform holes 16. Holes 16 are spaced sufficiently from each other to provide pan 10 with structural integrity and to avoid clumping of food products extruded through said holes. The term "clumping" is used herein to refer to the situation wherein food product extruded through one hole clings or attaches to food product extruded through another hole. Holes 16 can be of any shape that is suitable for extruding food products but are preferably circular. Typical dimensions of the holes 16 range from about ¼ inch to about 5/16 inches in diameter. The ratio of the average diameter of holes 16 to the average spacing between the centers of holes 16 preferably ranges from about 5:11 to about 44:13. The array preferably includes a first set of parallel spaced rows of holes 16 offset by a second set of parallel spaced rows of holes 16, rows in the first set alternating in sequence with rows in the second set. The array preferably has a width of the size of a standard stirring utensil, such as a spatula, for optionally mixing the food product and for forcing or extruding the food product through holes 16. The array has a length that is sufficient to provide for the extrusion of a suitable amount of extruded food product with each pass of the stirring utensil.

In a preferrecd embodiment removable clamp 30 is provided for mounting pan 10 on cooking vessel 32. Cooking vessel 32 is a cylindrical pot or kettle of standard design and dimensions. Preferably, vessel 32 is a 4 or 6 quart kettle. Clamp 30 includes an elongated central web portion 34 which is formed integrally with downwardly facing U-shaped bracket member 36 which extends from and overhangs one end of web portion 34, and downwardly facing U-shaped bracket member 38 which extends from and underlies the other end of web portion 34. Bracket 36 is adapted for removable attachment to the side wall 14 of pan 10. Bracket 38 is adapted for attachment to the top edge of cooking vessel 32. When bracket 30 is attached to pan 10 the underside of bottom 12 overlies the top surface of central web portion 34. The horizontal extent of web portion 34 is dependent upon the diameter of bottom 12. Preferably, when pan 10 is mounted on cooking vessel 32 (FIG. 6) part of the bottom 12 overhangs the exterior of cooking vessel 32 while the remaining part of bottom 12 overhangs the interior of cooking vessel 32. The extrusion section 18 preferably overhangs the interior of cooking vessel 32 to facilitate extrusion of the extrudable food product through holes 16 into cooking vessel 32, and at least a substantial portion of food holding area 20 overhangs the exterior of cooking vessel 32 so that the food held in holding area 20 is not exposed to the heat and/or steam arising from cooking vessel 32 and thereby does not prematurely cook or set up. It will be understood by those skilled in the art that bracket 30 can be fixedly attached to pan 10 and/or cooking vessel 32, although it is preferable that bracket 30 be removably attachable to pan 10 and cooking vessel 32. It will also be understood by those skilled in the art that pan 10 can be manually held over cooking vessel 32 while the extrudable food product is extruded through holes 16, thus avoiding the necessity of using bracket 30.

In operation, a cooking liquid such as, for example, boiling water is deposited in cooking vessel 32, and an extrudable food product such as, for example, a typical dumpling formulation, is deposited in food holding area 20. The extrudable food product can be mixed in a separate container and/or mixed in food holding area 20. A portion of the extrudable food product is transferred from food holding area 20 to extrusion area 18 by means of a suitable food mixing or scraping device such as, for example, a spatula. The food product is extruded through holes 16 for forcing the food through holes 16 with the spatula. The food drops into cooking vessel 32 and is cooked therein. The cooked food is separated from the cooking liquid for conventional techniques well known to those skilled in the art.

Preferably the food extrusion area 18 is held over the interior of the cooking vessel 32 thereby exposing the food product in the food extrusion area to the heat and/or vapors arising from cooking vessel 32. The arising heat and/or vapors usually have the effect of partially cooking or at least setting up of the food product prior to extrusion. Preferably, the food holding area 20 is held away from the interior of cooking vessel 32 to avoid premature cooking or setting up of the food product held in food holding area 20.

An advantage of pan 10 is that it can be readily converted to a conventional baking pan merely by placing foil or any other suitable medium over holes 16.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A cooking utensil comprising a pan with a flat bottom and vertical side means formed integrally with said bottom, and an array of evenly spaced substantially uniform holes formed only in a portion of said bottom to provide a food extrusion area, the remaining portion of said bottom providing a food holding area, said food holding area comprising at least one-half of the surface area of said bottom, and clamping means for mounting said pan on a cooking vessel, said clamping means comprising a central web portion with a first downwardly facing U-shaped bracket member extending from and overhanging a first end of said web portion and a second U-shaped bracket member extending from an underlying a second end of said web portion, said first end of said web portion being opposite said second end of said web portion, said first U-shaped bracket being adapted for attachment to said pan, said second U-shaped bracket being adapted for attachment to said cooling vessel.

2. The utensil of claim 1 wherein said holes are spaced sufficiently from each other to provide said utensil with structural integrity and to avoid clumping of food extruded through said holes.

3. The utensil of claim 1 wherein said bottom is circular.

4. The utensil of claim 1 wherein the ratio of the average diameter of said holes to the average spacing between the centers of said holes is in the range of about 5:11 to about 4:13.

5. The utensil of claim 1 wherein said pan is formed of a relatively lightweight material to enable facilitated handling by a user.

6. The utensil of claim 1 wherein said pan is formed of a material selected from the group consisting of sheet metal, aluminum or heat-resistant plastic.

7. The utensil of claim 1 wherein said holes are circular with an average diameter in the range of about ¼ to about 5/16-inch.

8. The utensil of claim 1 wherein said side means includes a top rolled edge.

9. The utensil of claim 1 wherein said bottom is a thin-walled circular member and said side means comprises a circumferentially mounted substantially vertically extending wall member that includes a top rolled edge.

10. The utensil of claim 1 wherein said bottom is formed of a sufficiently thin-walled material to enable facilitated dislodgement of food from said holes by scraping the top surface area of said bottom with scraper means.

11. The utensil of claim 1 wherein said array includes a first set of parallel spaced rows of said holes offset by a second set of parallel spaced rows of said holes, the rows in said first set alternating in sequence with the rows in said second set.

12. The utensil of claim 1 wherein said clamping means comprises a mounting bracket fixedly attached to said pan.

13. The utensil of claim 1 wherein said pan is circular with a diameter in the range of about 7 to about 12 inches.

14. The utensil of claim 1 wherein the average spacing between the centers of said holes is in the range of about 11/16 to about 13/16 inch.

15. The utensil of claim 1 wherein said clamping means is removably attached to said pan.

* * * * *